US009060386B2

(12) United States Patent
Cha et al.

(10) Patent No.: US 9,060,386 B2
(45) Date of Patent: Jun. 16, 2015

(54) METHOD OF SELECTING RELAY MODE IN MOBILE AD-HOC NETWORK

(71) Applicant: ELECTRONICS AND TELECOMMUNICATIONS RESEARCH INSTITUTE, Daejeon (KR)

(72) Inventors: Woo-Suk Cha, Jeollanam (KR); Jun-Keun Song, Daejeon (KR); Seon-Tae Kim, Daejeon (KR); Tae-Jin Lee, Suwon (KR); Jong-Ho Park, Suwon (KR); Chang-Young Oh, Suwon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 89 days.

(21) Appl. No.: 13/707,028

(22) Filed: Dec. 6, 2012

(65) Prior Publication Data
US 2013/0279398 A1    Oct. 24, 2013

(30) Foreign Application Priority Data
Apr. 23, 2012  (KR) .......................... 10-2012-0042316

(51) Int. Cl.
| H04B 7/14 | (2006.01) |
| H04W 84/18 | (2009.01) |
| H04B 7/155 | (2006.01) |
| H04W 40/02 | (2009.01) |
| G01R 31/08 | (2006.01) |

(Continued)

(52) U.S. Cl.
CPC ................. *H04W 84/18* (2013.01); *H04B 7/14* (2013.01); *H04B 7/15507* (2013.01)

(58) Field of Classification Search
CPC .. H04B 7/14; H04B 7/15592; H04B 7/15507; H04L 45/32; H04L 45/44; H04L 45/02; H04L 45/021; H04L 45/026; H04L 45/26; H04L 47/14; H04W 84/18; H04W 40/22; H04W 40/24; H04W 40/023
USPC .......................................... 370/315; 455/454
See application file for complete search history.

(56) References Cited

U.S. PATENT DOCUMENTS 8,705,379 B2 *   4/2014   Wu et al. ....................... 370/248

FOREIGN PATENT DOCUMENTS

KR    10-2007-0083027         8/2007

OTHER PUBLICATIONS

C. Adjih, P. Jacquet, and L.Viennot, Computing connected dominated sets with mulitpoint relays, technical report, INRIA, Oct. 2002.*

(Continued)

*Primary Examiner* — Alpus H Hsu
*Assistant Examiner* — Elton Williams
(74) *Attorney, Agent, or Firm* — Staas & Halsey LLP

(57) ABSTRACT

Disclosed herein is a method of selecting a relay node in a mobile ad-hoc network. The relay node selection method includes updating a neighbor node list based on messages received from one or more other nodes, and selecting a 1-hop neighbor node having a highest Multi-Point Relay (MPR) selector counter (MSC) value, from among one or more 1-hop neighbor nodes included in the updated neighbor node list, as an MPR node. Therefore, the present invention can prevent unnecessary channel competition and conflicts between nodes and improve network performance.

6 Claims, 5 Drawing Sheets

(51) Int. Cl.
*H04L 12/28* (2006.01)
*H04H 20/71* (2008.01)
*H04W 40/00* (2009.01)

(56) References Cited

OTHER PUBLICATIONS

A. Busson, N. Milton, E. Fleury: Analysis of the Multi-Point Relay Selection in OLSR and Implications, in the $th Mediterranean Ad Hoc Networking Workshop, MED-HOC-NET 05, Proquerolles, France, Jun. 2005.*

J. Wu, An enhanced approach to determine a small forward node set based on multipoint relays IEEE 58th Vehicular Technology Conference, vol. 4, pp. 2774-2777, Oct. 2003.*

B. Mans and N. Shrestha, "Performance Evaluation of Approximation Algorithms for Multipoint Relay Selection," Med-Hoc-Net 2004, 3rd Annual Mediterranean Ad Hoc Net. Wksp., Bodrum, Turky, Jun. 27-30, 2004.*

T. Clausen, Ed.; P. Jacquet, Ed. Optimized Link State Routing Protocol (OLSR); Project Hipercom, INHRIA; Oct. 2003.*

Dang Nguyen et al., "Analysis of MPR Selection in the OLSR Protocol", AINAWc'07, pp. 887-892, 2007.

Kenji Yamada et al., "Cooperative MPR Selection to Reduce Topology Control Packets in OLSR", TENCON 2010, pp. 293-298, 2010.

Yunfei Bai et al., "An Optimized Method for Minimum MPRs Selection Based on Node Density", WiCOM ;2010, pp. 1-4.

* cited by examiner

METHOD OF SELECTING RELAY MODE IN MOBILE AD-HOC NETWORK

CROSS REFERENCE TO RELATED APPLICATION

This application claims the benefit of Korean Patent Application No. 10-2012-0042316, filed on Apr. 23, 2012, which is hereby incorporated by reference in its entirety into this application.

BACKGROUND OF THE INVENTION

1. Technical Field

The present invention relates generally to mobile ad-hoc network technology and, more particularly, to a method of selecting a relay node in a mobile ad-hoc network, which can be applied to data flooding in a mobile ad-hoc network environment.

2. Description of the Related Art

A Mobile Ad-hoc network (MANET) is a self-configuring and dynamically changing multi-hop network, and all mobile nodes constituting the ad-hoc network can communicate with one another without passing through existing communication infrastructures (for example, a base station or an access point) or an existing central control unit.

Therefore, a mobile ad-hoc network can be used as a temporarily configured network, a disaster/calamity recovery or rescue network for an earthquake, typhoon, or terrorism, a military network for the battlefield, and a Bluetooth or Home Radio Frequency (HomeRF) network in a Local Area Network (LAN) environment.

In a mobile ad-hoc network, broadcasting is widely used to perform route search, address setup, or various application tasks. In the mobile ad-hoc network, each node has a limited transmission coverage area, so that it functions as a router for transmitting information to a destination.

Of methods of transmitting data over a mobile ad-hoc network, the simplest method is to use data flooding.

Data flooding is a method of transmitting packets received by each node to a neighbor node, storing the packets to refer to the packets later, and discarding subsequently received packets if it is determined that the received packets are packets that had previously been transmitted.

For such data flooding, each node must perform the procedure of searching for a neighbor node to which data is to be transmitted and selecting a routing path.

Conventional routing path selection methods use ad-hoc routing protocols, such as for an Optimized Link State Routing (OLSR) algorithm. Such an OLSR algorithm is a method by which individual nodes search for neighbor nodes through the exchange of Hello messages and then select routing paths. In this method, the individual nodes update their own routing tables by sharing neighbor node information collected through the exchange of Hello messages.

Further, the OLSR method supports efficient data flooding using a Multi-Point Relay (MPR) technique. The OLSR method allows each node to select a minimum number of 1-hop neighbor nodes capable of transmitting data to all 2-hop neighbor nodes, from among its own 1-hop neighbor nodes, as its own MPR nodes, and allows only the nodes selected as the MPR nodes to retransmit data.

However, the MPR node selection technique applied to the conventional OLSR method is disadvantageous in that each node independently selects an MPR node, so that the number of nodes selected as MPR nodes increases, thus deteriorating the efficiency of data flooding.

Further, there is a problem in that as the number of nodes participating in data retransmission increases when data is flooded in the mobile ad-hoc network environment, the probability of channel competition and conflicts increases, thus deteriorating the overall network performance.

Korean Patent No. 10-755709 discloses a multicast transmission method by which a source node learns information about neighbor nodes via a flooding procedure, selects 1-hop neighbor nodes capable of covering 2-hop neighbor nodes as MPR nodes on the basis of the learned information, and eliminates MPR nodes that cover 2-hop neighbor nodes in a duplicated manner from the selected MPR nodes. However, this patent is disadvantageous in that when the number of source nodes becomes larger, the respective source nodes can select different MPR nodes, so that network overhead and conflicts increase, thus deteriorating the overall throughput.

SUMMARY OF THE INVENTION

Accordingly, the present invention has been made keeping in mind the above problems occurring in the prior art, and an object of the present invention is to provide a method of selecting a relay node, which reduces the probability of channel competition and conflicts in a mobile ad-hoc network, thus improving the overall performance of a network.

In accordance with an aspect of the present invention to accomplish the above object, there is provided a method of selecting a relay node, the method being performed by a node, including updating a neighbor node list based on messages received from one or more other nodes, and selecting a 1-hop neighbor node having a highest Multi-Point Relay (MPR) selector counter (MSC) value, from among one or more 1-hop neighbor nodes included in the updated neighbor node list, as an MPR node.

Preferably, the updating the neighbor node list based on the messages received from the one or more other nodes may include receiving Hello messages, each containing MSC value information, from the one or more other nodes, and updating the neighbor node list depending on the MSC value information included in the one or more Hello messages.

Preferably, the selecting the 1-hop neighbor node having the highest MSC value, from among the one or more 1-hop neighbor nodes, as the MPR node may be configured to select a 1-hop neighbor node having a highest MSC value and a largest number of neighbor nodes, from among the one or more 1-hop neighbor nodes, as the MPR node.

Preferably, the selecting the 1-hop neighbor node having the highest MSC value, from among the one or more 1-hop neighbor nodes, as the MPR node may include aligning one or more 1-hop neighbor nodes included in the updated neighbor node list depending on MSC values, and aligning the one or more 1-hop neighbor nodes depending on a number of neighbor nodes of each of the 1-hop neighbor nodes included in the neighbor node list and aligned depending on the MSC values.

Preferably, the selecting the 1-hop neighbor node having the highest MSC value, from among the one or more 1-hop neighbor nodes, as the MPR node may include selecting the 1-hop neighbor node having the highest MSC value as the MPR node, and then determining whether the selected MPR node includes at least one neighbor node, if the selected MPR node includes at least one neighbor node, eliminating neighbor nodes corresponding to the selected MPR node from the neighbor node list, and then updating the neighbor node list, and selecting a 1-hop neighbor node having a highest MSC value, from among one or more 1-hop neighbor nodes included in the updated neighbor node list, as the MPR node.

Preferably, the method may further include receiving a message including an MPR node list from a predetermined node, if a corresponding node is included in the MPR node list, increasing an MSC value of the corresponding node, and transmitting information about the increased MSC value to one or more other nodes.

Preferably, the method may further include if the predetermined node that transmitted the MPR node list leaves a transmission coverage area of the corresponding node, or if the predetermined node excludes the corresponding node from MPR nodes, decreasing the MSC value of the corresponding node.

In accordance with another aspect of the present invention to accomplish the above object, there is provided a method of selecting a relay node, the method being performed by a predetermined node of a mobile ad-hoc network, including (a) receiving one or more Hello messages, each containing Multi-Point Relay (MPR) Selector Counter (MSC) value information, from one or more neighbor nodes, (b) updating a neighbor node list depending on the MSC value, (c) aligning one or more 1-hop neighbor nodes included in the updated neighbor node list depending on the MSC value and a number of neighbor nodes of each of the one or more 1-hop neighbor nodes, and (d) selecting a 1-hop neighbor node having a highest MSC value and a largest number of neighbor nodes as an MPR node.

Preferably, the method may further include, after (d), determining whether the selected MPR node includes at least one neighbor node, if the selected MPR node includes at least one neighbor node, eliminating neighbor nodes corresponding to the selected MPR node from the neighbor node list, and repeatedly performing (c) and (d) using the neighbor node list from which the neighbor nodes corresponding to the selected MPR node have been eliminated.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
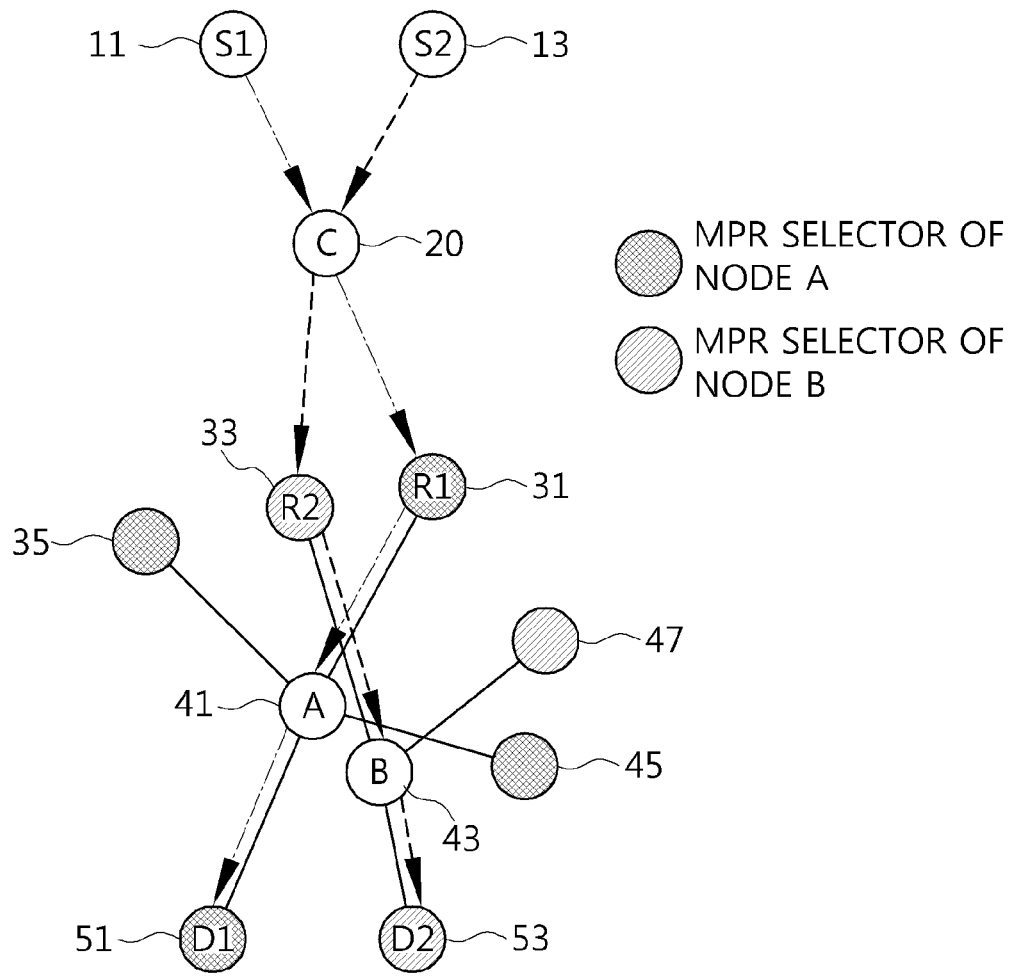
FIG. 1 is a conceptual diagram showing an MPR node selection method based on OLSR in a mobile ad-hoc network.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, preferred embodiments of the present invention will be described in detail with reference to the attached drawings.

FIG. 1 is a conceptual diagram showing a Multi-Point Relay (MPR) node selection method based on Optimized Link State Routing (OLSR) in a mobile ad-hoc network.

Referring to FIG. 1, when a predetermined node selects a relay node (hereinafter referred to as an "MPR node") using an OLSR method, the predetermined node selects 1-hop neighbor nodes, having the largest number of 2-hop neighbor nodes within a transmission coverage area, from among 1-hop neighbor nodes, as MPR nodes.

For example, in a network environment shown in FIG. 1, when a source node S1 11 transmits data to a destination node D1 51, and a source node S2 13 transmits data to a destination node D2 53, pieces of data respectively transmitted by the source node S1 11 and the source node S2 13 are transmitted to a node C 20. The node C 20 transmits the pieces of data respectively received from the source nodes 11 and 13 to a node R1 31 and a node R2 33, respectively.

The node R1 31 and node R2 33 select a node A 41 and a node B 43, which are 1-hop neighbor nodes including the largest number of 2-hop neighbor nodes within a transmission coverage area, from among 1-hop neighbor nodes, as their MPR nodes, respectively, so as to select MPR nodes to which the pieces of received data are to be transmitted. Here, the nodes A 41 and B 43 include three 2-hop neighbor nodes within the transmission coverage area around the nodes R1 31 and R2 33, respectively.

MPR node selection techniques based on OLSR are configured such that since each node independently selects an MPR node, percentages of selection of nodes 31, 35, 45, and 51 which select the node A 41 as an MPR node, and nodes 33, 47, and 53 which select the node B 43 as an MPR node are similar, as shown in FIG. 1.

Consequently, the data transmitted from the source node S1 11 is transferred to the destination node D1 51 via nodes C 20, R1 31, and A 41, and data transmitted from the source node S2 13 is transferred to the destination node D2 53 via nodes C 20, R2 33, and B 53. In this case, since the nodes A 41 and node B 43 are located within their mutual coverage areas, there is a high probability that channel competition and conflicts will occur when data is flooded.

Therefore, in order to solve the above-described problem, the improvement of the MPR node selection method based on OLSR is required.

The method of selecting an MPR node in a mobile ad-hoc network according to an embodiment of the present invention provides a method of selecting MPR nodes so that when data is flooded in the mobile ad-hoc network, data can be intensively transmitted via a specific node without being distributed over and transmitted via different nodes.

In the present invention, when MPR nodes participating in data retransmission are selected, the number of MPR node selectors (an MPR selector counter, hereinafter referred to as an "MSC") of each 1-hop neighbor node is taken into consideration, and neighbor nodes having a higher MSC value are selected as MPR nodes, thus enabling the number of MPR nodes participating in data flooding to be minimized. Here, the MPR selector of a predetermined node denotes a neighbor node that selected the predetermined node as an MPR node, and MSC denotes the number of neighbor nodes that selected the predetermined node as an MPR node.

Figure 2:
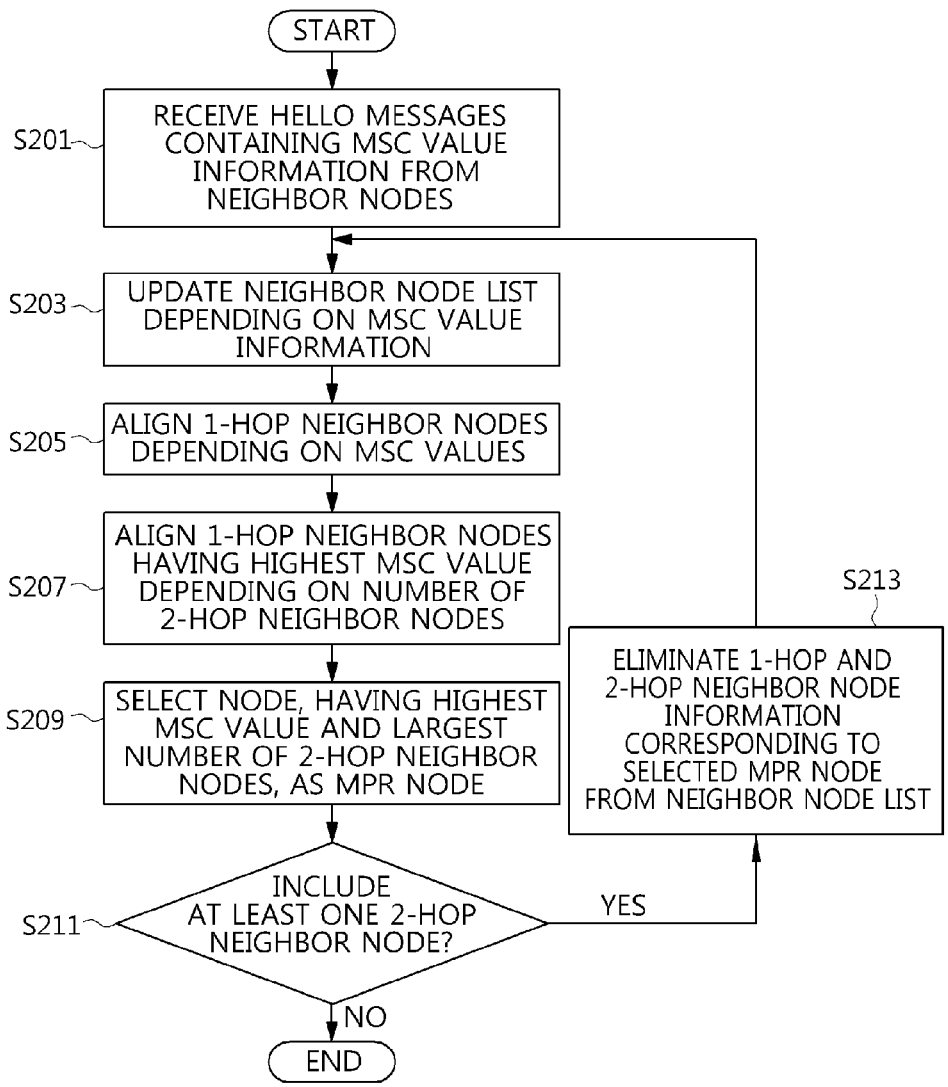
FIG. 2 is a flowchart showing a method of selecting a relay node in a mobile ad-hoc network according to an embodiment of the present invention.

FIG. 2 is a flowchart showing a method of selecting an MPR node in a mobile ad-hoc network according to an embodiment of the present invention.

First, each node selects its own 1-hop neighbor nodes as MPR nodes, and thereafter sends a Hello message containing an MPR list to the nodes selected as the MPR nodes so as to notify them that they have been selected as the MPR nodes.

Each node that received the Hello message determines whether the node itself is included in the MPR list contained in the Hello message. If it is determined that the node itself is included in the MPR list, the node recognizes the node that transmitted the Hello message as an MPR selector, and increases its MSC value.

Further, each node decreases its MSC value when a certain node that selected the corresponding node as an MPR node leaves the transmission coverage area of the corresponding node or excludes the corresponding node from the MPR nodes.

The MPR node selection method according to an embodiment of the present invention is configured to, when each node exchanges a Hello message with other nodes as described above, allow its own MSC value to be included in the existing Hello message and notify neighbor nodes of the number of nodes that selected the corresponding node as an MPR node (that is, an MSC value). For this operation, the format of the Hello message may additionally have an MSC field, and allow MSC value information to be included in a neighbor node list and to be managed.

Referring to FIG. 2, a predetermined node receives Hello messages, each containing MSC value information, from one or more nodes at step S201, and updates a neighbor node list managed thereby depending on the MSC value information (MSC values) contained in the received Hello messages at step S203.

Thereafter, the predetermined node aligns 1-hop neighbor nodes in descending order of MSC values depending on the MSC values in the neighbor node list at step S205, and aligns the 1-hop neighbor nodes depending on the number of neighbor nodes of the aligned 1-hop neighbor nodes (that is, the number of 2-hop neighbor nodes of the predetermined node) at step S207.

That is, after the predetermined node has aligned the 1-hop neighbor nodes included in the neighbor node list in descending order of MSC values, it aligns 1-hop neighbor nodes having the same MSC value depending on the number of 2-hop neighbor nodes, so that the predetermined node aligns the list of 1-hop neighbor nodes in descending order of MSC values and the number of 2-hop neighbor nodes.

Thereafter, the predetermined node selects, as an MPR node, a 1-hop neighbor node having the highest MSC value and the largest number of 2-hop neighbor nodes from the aligned neighbor node list, as described above, at step S209.

As described above, after selecting the MPR node, the predetermined node determines whether the selected MPR node includes at least one neighbor node (that is, a 2-hop neighbor node of the predetermined node) at step S211. If it is determined that the selected MPR node does not include any 2-hop neighbor node, the predetermined node determines the MPR node, selected at step S209, to be a final MPR node.

In contrast, if it is determined that the MPR node selected at step S209 includes at least one 2-hop neighbor node, the predetermined node eliminates 1-hop and 2-hop neighbor nodes corresponding to the selected MPR node from the neighbor node list at step S213, and repeatedly performs the steps starting from step S203. Accordingly, the predetermined node selects a node, having the highest MSC value and the largest number of 2-hop neighbor nodes, as the MPR node.

As shown in FIG. 2, the MPR node selection method according to an embodiment of the present invention selects a 1-hop neighbor node as an MPR node based on the highest MSC value, so that flooded data can be intensively transmitted via a specific node. By means of this, channel competition or conflicts between the nodes A 41 and B 43 shown in FIG. 1 can be prevented.

Figure 3:
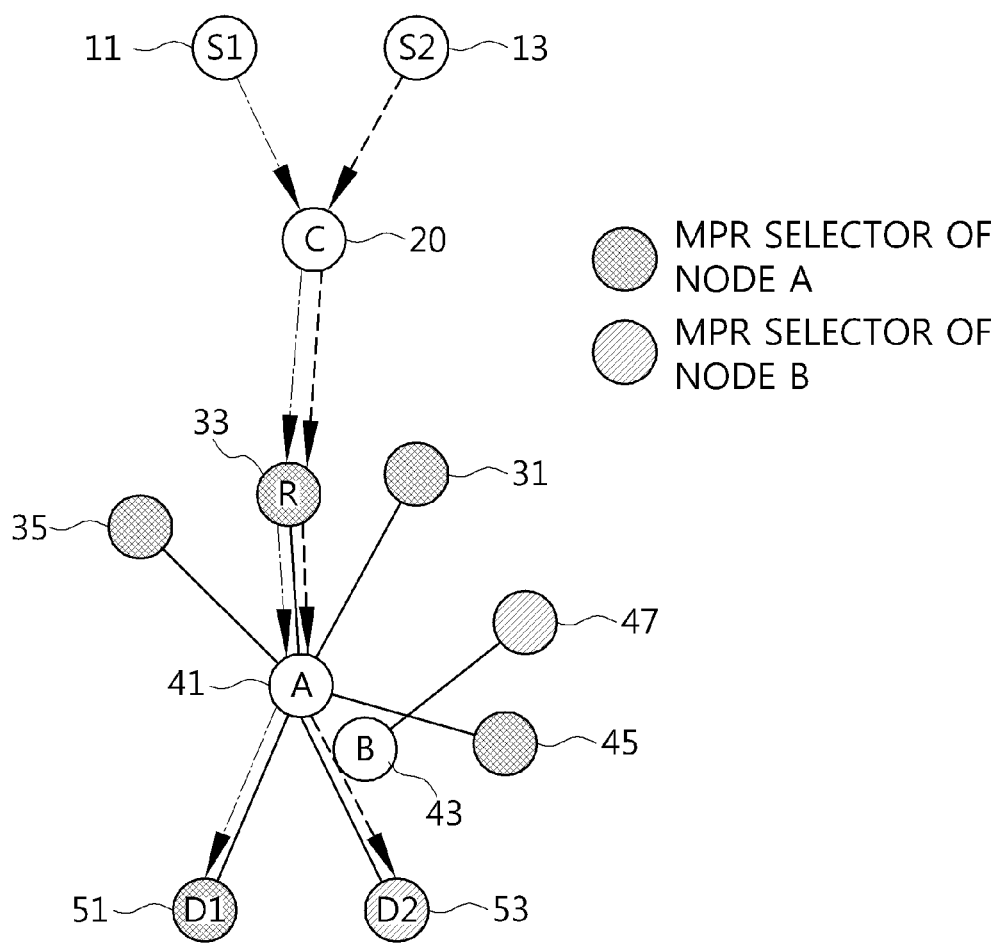
FIG. 3 is a conceptual diagram showing data flooding performed when the relay node selection method in the mobile ad-hoc network is applied according to an embodiment of the present invention.

FIG. 3 is a conceptual diagram showing data flooding performed when the MPR node selection method in the mobile ad-hoc network according to an embodiment of the present invention is applied, and shows in detail data flooding performed when an MPR node is selected based on MSC values.

In an MPR node selection method based on typical OLSR, each node independently selects an MPR node, as shown in FIG. 1, so that the number (4) of nodes that selected a node A 41 as the MPR node and the number (3) of nodes that selected a node B 43 as the MPR node are similar to each other.

However, the MPR node selection method according to an embodiment of the present invention has a high probability that the node, previously selected as an MPR node, will be selected again as an MPR node, as shown in FIG. 3. Accordingly, the number (6) of nodes that selected the node A 41 as an MPR node is greater than the number (1) of nodes that selected the node B 43 as an MPR, so that a node R 33 selects the node A 41 as the MPR node.

In the mobile ad-hoc network environment shown in FIG. 3, when a source node S1 11 transmits data to a destination node D1 51, and a source node S2 13 transmits data to a destination node D2 53, pieces of data transmitted from the nodes S1 11 and S2 13 pass through a node C 20 and the node R 33, and are then relayed only via the node A 41. Therefore, the probability of channel competition and conflicts between the node A 41 and the node B 43 shown in FIG. 1 can be decreased.

Figure 4:
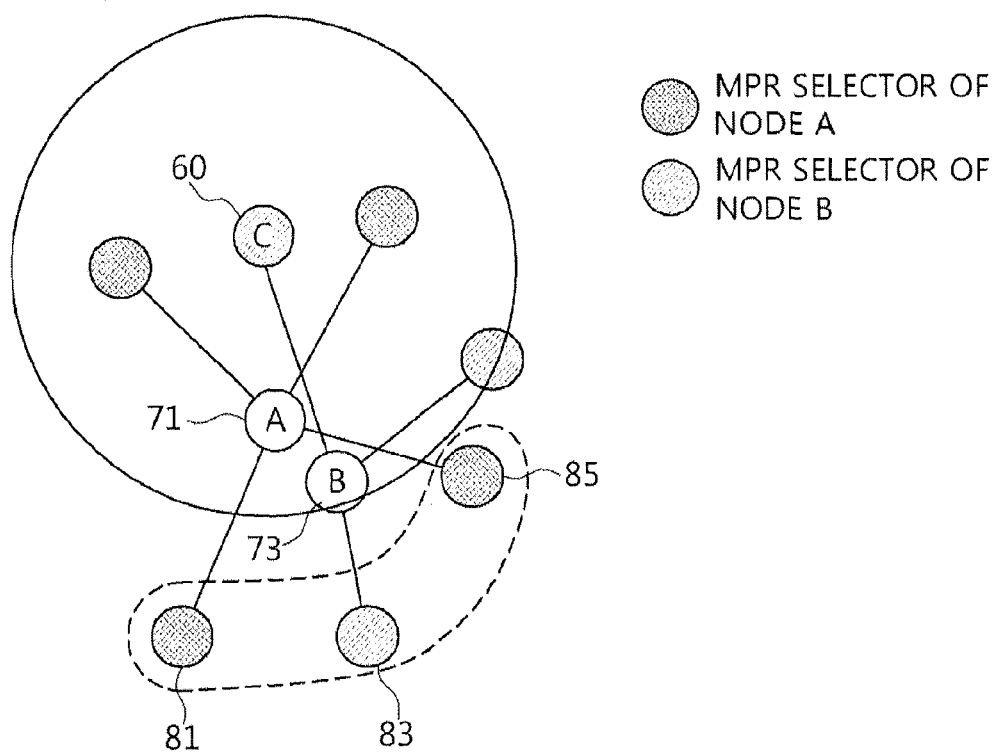
FIGS. 4 and 5 are conceptual diagrams showing a comparison between the relay node selection method according to the embodiment of the present invention and a conventional method.
Figure 5:
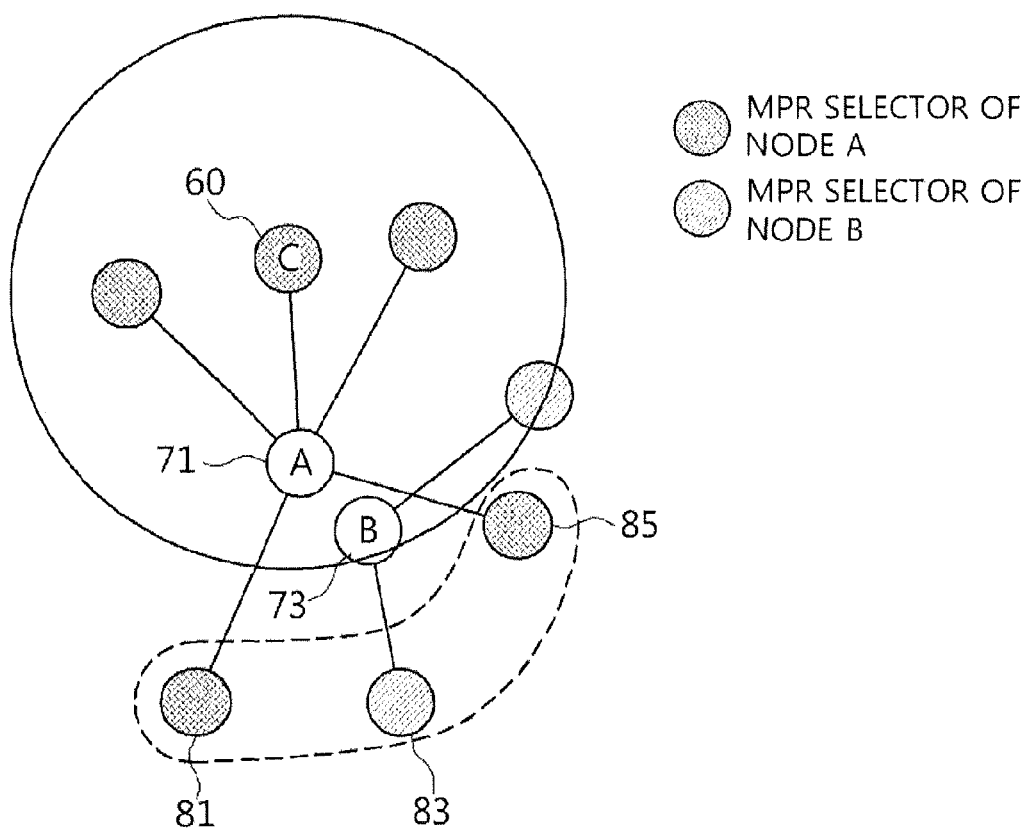

FIGS. 4 and 5 are conceptual diagrams showing a comparison between the MPR node selection method according to an embodiment of the present invention and a conventional method.

FIG. 4 illustrates an example in which a node C 60 selects an MPR node using an MPR node selection method based on conventional OLSR, and FIG. 5 illustrates an example in which the node C 60 selects an MPR node based on MSC values according to an embodiment of the present invention.

Referring to FIG. 4, when the node C 60 selects an MPR node according to the MPR selection method based on the conventional OLSR, the node C 60 checks the number of 1-hop neighbor nodes of each of 1-hop neighbor nodes A 71 and B 73 (that is, the number of 2-hop neighbor nodes of the node C 60), and selects a 1-hop neighbor node having the largest number of 2-hop neighbor nodes as an MPR node.

In this case, the node C 60 randomly selects any one of the node A 71 and the node B 73 as an MPR node because the number of 2-hop neighbor nodes 81, 83 and 85 of the node C 60 that go via the node A 71 and the number of 2-hop neighbor nodes 81, 83, and 85 of the node C 60 that go via the node B 73 all equally correspond to 3.

In contrast, as shown in FIG. 5, when the MPR node is selected according to an embodiment of the present invention, for the node A 71 that is the 1-hop neighbor node of the node C 60, the number of neighbor nodes selected as MPR nodes is 6 (that is, MSC=6), and for the node B 73, the number of neighbor nodes selected as MPR nodes is 2 (that is, MSC=2).

Accordingly, the node C 60 changes the MPR node in such a way as to select the node A 71 having a higher MSC value as the MPR node.

According to the present invention, when a predetermined node selects an MPR node for data retransmission, a neighbor node having the highest MSC value is selected as an MPR node in consideration of MSC values of 1-hop neighbor nodes.

Therefore, when data is flooded in a mobile ad-hoc network environment, data is intensively transmitted via a specific node, thus preventing unnecessary channel competition and conflicts from occurring, and improving overall network performance thanks to such prevention.

Further, unnecessary channel competition and conflicts are prevented when data flooding is performed, so that data retransmission and data errors can be prevented, thus improving the efficiency of resource usage and the quality of services.

As described above, in the method of selecting a relay node in a mobile ad-hoc network according to the present invention, the configurations and schemes in the above-described embodiments are not limitedly applied, and some or all of the above embodiments can be selectively combined and configured so that various modifications are possible.

What is claimed is:

1. A method of selecting a relay node, the method being performed by a predetermined node, comprising:
    updating a neighbor node list based on messages received from one or more other nodes;
    selecting a 1-hop neighbor node having a highest Multi-Point Relay (MPR) selector counter (MSC) value, from among one or more 1-hop neighbor nodes included in the updated neighbor node list, as an MPR node, where the MSC value denotes a number of the 1-hop neighbor nodes that selected the predetermined node as the MPR node;
    aligning one or more 1-hop neighbor nodes included in the updated neighbor node list depending on MSC values; and
    aligning the one or more 1-hop neighbor nodes depending on a number of neighbor nodes of each of the 1-hop neighbor nodes included in the neighbor node list and aligned depending on the MSC values,
    wherein updating the neighbor node list comprises:
        receiving one or more Hello messages containing a list of MPR nodes as an MPR list,
        determining if the predetermined node is included in the MPR list,
        increasing an MSC value of the predetermined node if the predetermined node is determined to be included in the MPR list, and
        transmitting the MSC value of the predetermined node to the one or more other nodes, and
    wherein the selecting the 1-hop neighbor node having the highest MSC value, from among the one or more 1-hop neighbor nodes, as the MPR node is configured to select a 1-hop neighbor node having a highest MSC value and a largest number of neighbor nodes, from among the one or more 1-hop neighbor nodes, as the MPR node.

2. The method of claim 1, wherein the updating the neighbor node list based on the messages received from the one or more other nodes comprises:
    receiving the one or more Hello messages, each containing MSC value information, from the one or more other nodes; and
    updating the neighbor node list depending on the MSC value information included in the one or more Hello messages.

3. The method of claim 1, wherein the selecting the 1-hop neighbor node having the highest MSC value, from among the one or more 1-hop neighbor nodes, as the MPR node comprises:
    selecting the 1-hop neighbor node having the highest MSC value as the MPR node, and then determining whether the selected MPR node includes at least one neighbor node;
    if the selected MPR node includes at least one neighbor node, eliminating neighbor nodes corresponding to the selected MPR node from the neighbor node list, and then updating the neighbor node list; and
    selecting a 1-hop neighbor node having a highest MSC value, from among one or more 1-hop neighbor nodes included in the updated neighbor node list, as the MPR node.

4. The method of claim 1, further comprising:
    receiving a message including an MPR node list from a predetermined node;
    if a corresponding node is included in the MPR node list, increasing an MSC value of the corresponding node; and
    transmitting information about the increased MSC value to one or more other nodes.

5. The method of claim 4, further comprising:
    if the predetermined node that transmitted the MPR node list leaves a transmission coverage area of the corresponding node, or if the predetermined node excludes the corresponding node from MPR nodes, decreasing the MSC value of the corresponding node.

6. A method of selecting a relay node, the method being performed by a predetermined node of a mobile ad-hoc network, comprising:
    receiving one or more Hello messages, each containing Multi-Point Relay (MPR) Selector Counter (MSC) value information, from one or more neighbor nodes, where the MSC value denotes a number of the neighbor nodes that selected the predetermined node as an MPR node;
    updating a neighbor node list depending on the MSC value;
    aligning one or more 1-hop neighbor nodes included in the updated neighbor node list depending on the MSC value and a number of neighbor nodes of each of the one or more 1-hop neighbor nodes;
    selecting a 1-hop neighbor node having a highest MSC value and a largest number of neighbor nodes as the MPR node;
    after the selecting the 1-hop neighbor node having the highest MSC value and the largest number of neighbor nodes as the MPR node, determining whether the selected MPR node includes at least one neighbor node;
    if the selected MPR node includes at least one neighbor node, eliminating neighbor nodes corresponding to the selected MPR node from the neighbor node list; and
    repeatedly performing the aligning one or more 1-hop neighbor nodes and the selecting the 1-hop neighbor node having the highest MSC value and the largest number of neighbor nodes as the MPR node using the neighbor node list from which the neighbor nodes corresponding to the selected MPR node have been eliminated,
    wherein updating the neighbor node list comprises:
        receiving one or more Hello messages containing a list of MPR nodes as an MPR list,
        determining if the predetermined node is included in the MPR list, increasing an MSC value of the predetermined node if the predetermined node is determined to be included in the MPR list, and transmitting the MSC value of the predetermined node to the one or more other nodes.

* * * * *